Sept. 5, 1944.  H. S. JACOBS ET AL  2,357,516
CRANE DRIVE SYSTEM
Filed Oct. 25, 1941  4 Sheets-Sheet 4

INVENTORS
Henry S. Jacobs
Will S. Burdick
BY
David A. Fox
ATTORNEY

Patented Sept. 5, 1944

2,357,516

UNITED STATES PATENT OFFICE 2,357,516

CRANE DRIVE SYSTEM

Henry S. Jacobs, Milwaukee, and Will S. Burdick, West Allis, Wis., assignors to Harnischfeger Corporation, Milwaukee, Wis., a corporation of Wisconsin Application October 25, 1941, Serial No. 416,596

5 Claims. (Cl. 172—284)

This invention relates to excavator cranes and the like and to drive systems therefor and resides more particularly in a combination of a continuously running prime mover with power transmission apparatus for such cranes by which the power of the prime mover is applied to effect working functions of such crane by means including a controllable torque transmitter which is dependent for its torque transmitting properties upon the reaction forces of eddy currents induced by controllable magnetic flux concentrations which are forced by the prime mover to traverse a conducting body.

Cranes and excavating cranes employing continuously running prime movers, such as internal combustion engines, are in wide use. Because of the power characteristics of such prime movers, the several instrumentalities to be driven in such cranes are customarily accelerated and driven by friction clutches. This permits the prime mover to continue running at fairly constant rate and at a rate at which power output and torque are fairly high. The speed of the prime mover in such cases is regulated by a governor.

While friction clutches are sufficiently effective for the above purposes to give to such machinery a high degree of utility, several distinctly disadvantageous properties are inherent in the friction clutch. One disadvantage is the continual wear of the friction linings. This necessitates frequent adjustment and periodic replacement of the friction bands or shoes. Another disadvantage is the considerable amount of effort required to actuate such clutches. To overcome the latter difficulty, self-energizing clutches or servo actuators have been employed, but this gives rise to grabbing, touchiness in response, and a necessity for even more frequent adjustment. Another disadvantage of such friction clutches is that the speed at which they operate must be limited to avoid the effects of centrifugal force, which would interfere with proper functioning of the parts. In order to obtain sufficient capacity at such lower speeds, such clutches must be made very large and heavy.

Even in the case of friction clutches of good design the operator must possess a high degree of skill in order to obtain high output without damage to the crane. For example, in a crane of substantial size, fitted with a long boom, a too sudden engagement of a swinging clutch may easily result in crumpling of the boom. The operator is consequently under a constant mental strain in choosing the proper compromise between high output and disaster.

Even when disastrous grabbing is avoided and normal slipping engagement is preserved, the forces frictionally transmitted by friction clutches rise to a peak with great suddenness. This is particularly true of the swing clutches, which are depended upon not only to accelerate all of the swinging parts of the crane, but also to decelerate them and to reverse their direction of rotation. In other words, said clutches are normally used to a considerable extent as brakes under conditions where the rate of slip amounts to 200% of full driving speed. The peak torque demand placed upon the prime mover by this arrangement is sufficiently severe to markedly slow down the running speed of the prime mover and to do so in a very short time interval. The action is so fast that the prime mover governor cannot respond in time to offset the deceleration. The characteristics of the internal combustion engine are such that power output ability falls off with loss of speed. By the time the governor comes into play the prime mover is no longer in condition to meet the load imposed. The power output of the engine is so impaired by the action that the swinging functions of the crane are rendered sluggish. This impairment of the power source also adversely affects the rate at which hoisting or other functions can be carried on simultaneously with swinging. While this adverse property of the arrangement may be alleviated in part by skillful manipulation on the part of the operator, it cannot be eliminated.

Among the objects of this invention are: the elimination of frictionally engaging parts, with consequent avoidance of the frequent adjustment and replacement of friction members; the reduction of operator effort to the mere throwing of a switch; the elimination of all possibility of grabbing, with consequent elimination of the hazard attendant thereon; the limitation of peak torque demands so as to provide sufficient time for the prime mover governor to effectively meet altering conditions and thus to increase the overall work capacity of the crane and the elimination of racking shocks and forces which produce unduly rapid deterioration of the machine. These and other objects of this invention and the means by which the same are accomplished will become apparent from the description of the invention which follows. This invention is herein described by reference to the accompanying drawings which form a part hereof and in which there is set forth by way of illustration and not of limitation one form of the apparatus of this invention.

Figure 1:
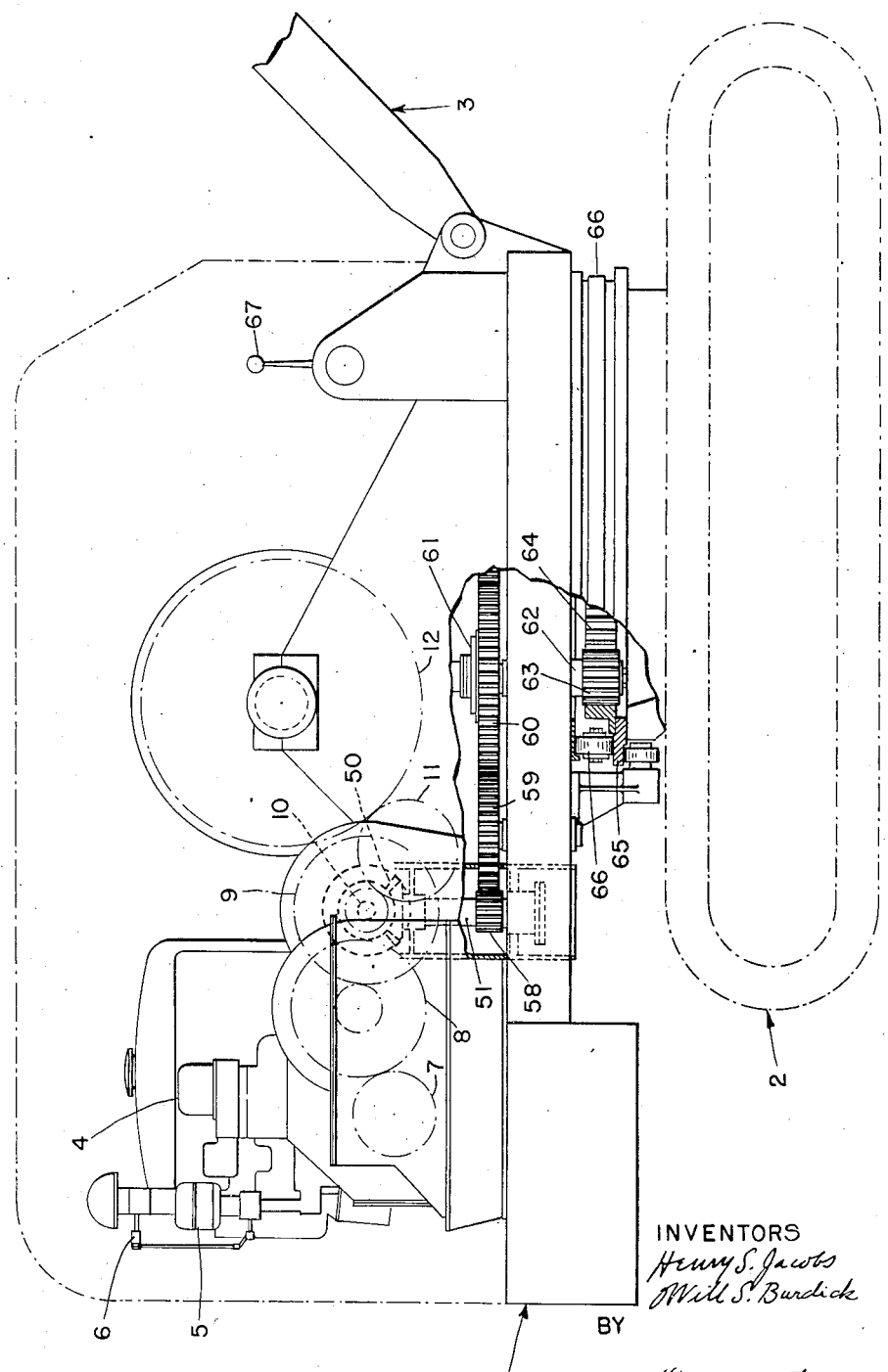
Fig. 1 is a side elevation, with parts broken away, of a crane embodying one form of the apparatus of this invention.

Referring now to the drawings, there is shown in Fig. 1 a cab 1 mounted for rotation upon a crawler base 2. A fragment of a boom 3 is shown mounted in conventional manner on the forward end of the cab. A prime mover in the form of an internal combustion engine 4 is located at the rear of the cab 1, as shown. The prime mover 4 is of the continuously running type, regulated by a governor 5 which controls the throttle 6. Power from the prime mover 4 is delivered through gearing 7, 8, and 9 to the jack-shaft 10. The jack shaft 10 serves to deliver through continuously running gear 11 and 12 power for the operation of drum-shaft 13. Jack-shaft 10 also extends across the cab 1 through the magnetic coupling means 14 and 15, which serve to deliver power for causing swinging motion of the crane.

In the form of the apparatus shown and herein described, the instrumentalities mounted upon the drum-shaft 13 for performing the various hoisting functions of the crane are arranged to be frictionally driven in the conventional manner and the details thereof are therefore not described. The magnetic coupling means 14 and 15, however, employed to regulate the swinging motion of the crane, are of novel form not heretofore employed in the driving system of cranes.

Figure 3:
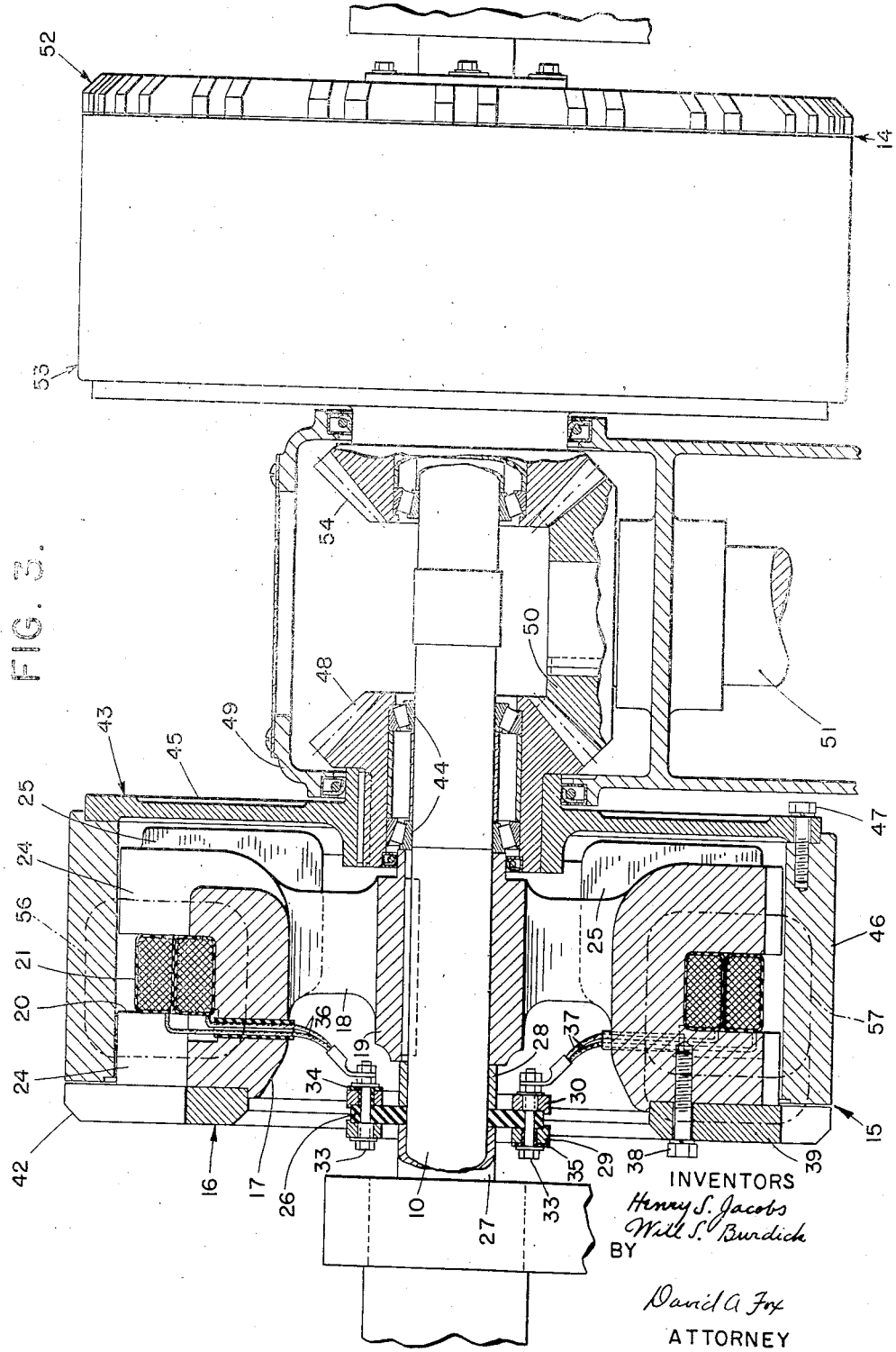
Fig. 3 is a fragmentary detailed end elevation, partly in section, of the eddy current coupling means viewed as indicated by the broken lines 3—3 in Figs. 2 and 4.

Magnetic coupling means 15 comprises a driving portion 16 which is keyed to the jack-shaft 10 to turn therewith. The driving member 16 is in the form of a wheel having a massive rim 17 carried on a plurality of spokes 18 which are integrally formed with the hub 19. The massive rim 17 is provided with a peripheral groove 20 in which there is accommodated a pair of peripheral magnetic windings 21. The outer periphery of the rim 17 is slotted transversely by alternate deep and shallow slots 22 and 23 forming a plurality of outwardly extending pole pieces 24 which extend outwardly along the sides of the coils 21, the pole pieces 24 being forked at their outer ends by reason of the slots 23 positioned therein. Opposite each of the pole pieces 24, standing to the left in Fig. 3, are located integrally-formed radial fins 25, which extend inwardly toward the hub 19, as shown. The fins 25 serve to enhance the rate of flow of air through the apparatus.

Also radially held with respect to the jack-shaft 10 to turn therewith is the insulating disk 26. The disk 26 is held securely in place between the sleeves 27 and 28, as shown. Mounted upon the opposite sides of the insulating disk 26 are slip-rings 29 and 30, the same being held in place by through-bolts 33. An insulated bushing 34 serves to insulate the through-bolt 33 which passes therethrough from the slip-ring 30 and, in like manner, the insulating bushing 35 serves to insulate the through-bolt which passes therethrough from the slip-ring 29.

The inner ends of the coils 21 are brought through leads and terminals into electrical connection with slip-ring 29, while the outer ends of the coils 21 are brought by leads and terminals 37 into electrical connection with slip-ring 30. The two parts of the pair of coils 21 are thus placed in shunt connection with one another. It is obvious that the windings may consist of a single coil or several coils, as may be desired or convenient. In the present instance two coils have been shown to permit reconnection for two different exciter voltage ranges, purely as a matter of convenience.

Secured to the left-hand face of the rim 17, as viewed in Fig. 3, by means of the bolts 38, is a side finger plate 39. The periphery of the side finger plate 39 is slotted by alternate deep and shallow slots 40 and 41, respectively, to form the forked pole fingers 42, as shown.

Mounted to turn upon the jack-shaft 10 is a driven coupling member 43, which is held in place for free turning movement upon the roller-bearing 44. The bearing 44 is of the conical thrust type so that the driven member 43 is held positively against endwise displacement with respect to the shaft 10. The driven member 43 comprises the mounting disk 45 to which the cylindrical sleeve 46 is secured by bolts 47, as shown. The internal diameter of the cylindrical sleeve 46 is very slightly larger than the diameter of the path swept by the outer tips of the pole pieces 24 so that a very small air-gap extends between the sleeve 46 and the ends of the pole pieces 24.

In the drawings this air-gap is shown slightly exaggerated for the purpose of clarity. The sleeve 46, furthermore, extends axially from the mounting disk 45 to a position where it is closely adjacent to the inside faces of the side fingers 42 so that there is a small air-gap between said fingers and said sleeve extensions. Here again this air-gap is shown slightly exaggerated for the sake of clarity.

Keyed to the mounting plate 45 of the driven member 43 is the bevel-pinion 48, which is contained within the reverse gear casing 49. The pinion 48 is positioned to mesh with a driven bevel-pinion 50 secured to the end of vertical shaft 51, which extends downwardly, as shown, from the gear casing 49.

The magnetic coupling means 14 mounted upon the opposite end of jack-shaft 10 is symmetrically similar in all respects to the magnetic coupling means 15, the same being provided with a driving member 52 and a driven member 53, which is rigidly associated with bevel-pinion 54.

Figure 4:
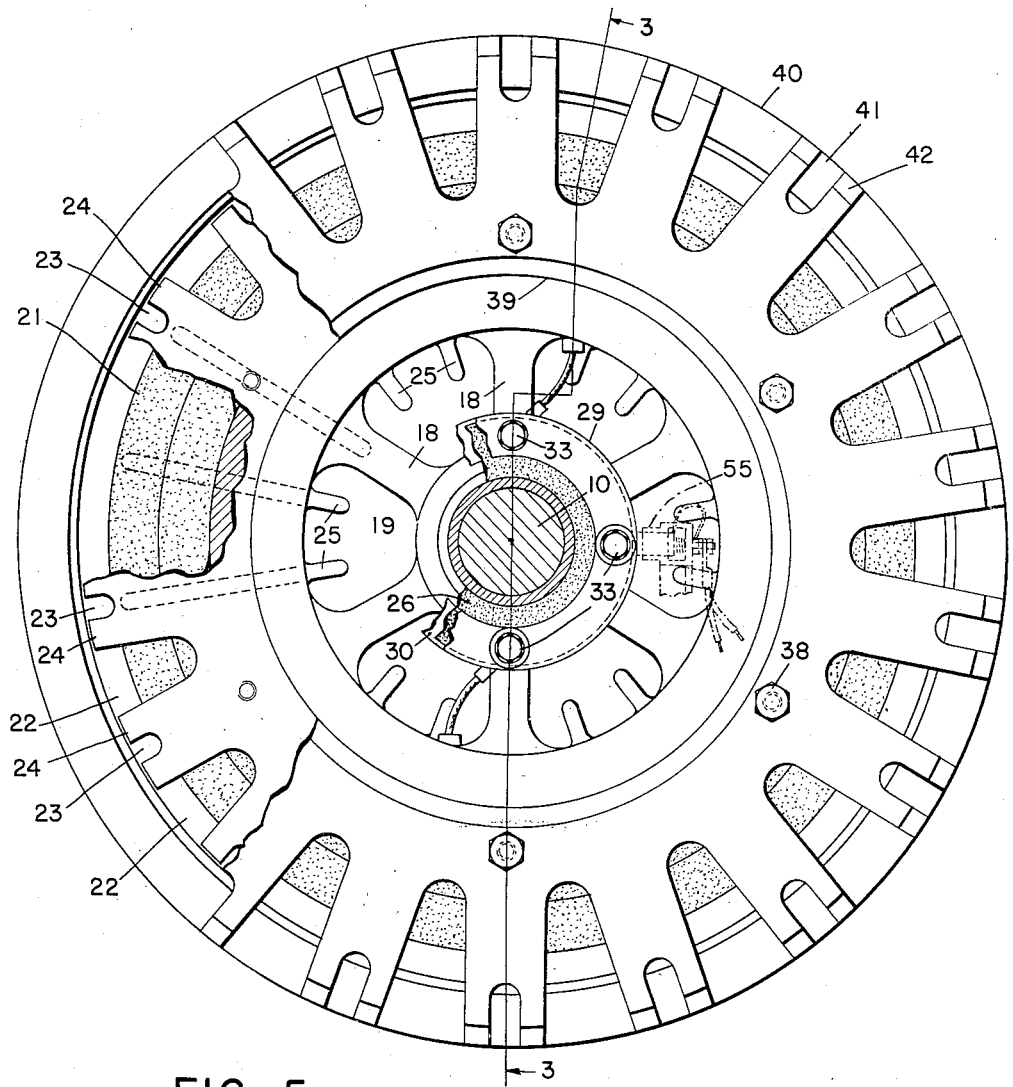
Fig. 4 is a detailed side elevation, with parts broken away, of the eddy current coupling means.

In order to supply current to the windings 21, slip ring brushes are positioned to engage the slip-rings 29 and 30. One of these is shown in dotted form and designated by the numeral 55 in Fig. 4. When the windings 21 are excited by current supplied thereto through the slip-rings and brushes, as described, a strong magnetic field is established, following the course of the broken line 56. The flux of this field bridges the gap between the ends of slotted pole pieces 24 and the cylindrical sleeve 46 extending through the cylindrical sleeve, as shown. When the driving portion 16 is rotated and the cylindrical sleeve 46 is stationary or lags behind the rate of rotation of driving member 16, strong eddy currents are created in the sleeve 46. According to well-known principles, these eddy currents are of such course and direction as to react against the movement of the localized flux zones through the material of the sleeve 46. As a result, torque is transmitted from the driving member 16 to the driven member 43, this torque being a function of the intensity of flux and the rate of slip between the driving and driven member. The power disappearance represented by the torque and rate of slip appears largely in the form of resistance heat within the conducting sleeve 46. The heat thus created causes the temperature of sleeve 46 to rise until the rate of heat dissipation therefrom equals the rate at which such heat is being generated. The draft of air caused by the configuration of the driving member 16 and the fins 25 facilitates this heat dissipation and serves to keep the temperature of the cylindrical sleeve 46 within safe operating limits.

The rise in temperature occurring in the sleeve 46 causes the same to expand slightly, thus increasing the air gap between it and the pole pieces 26. This same expansion, however, tends to reduce the air gap between the sleeve 46 and the side fingers 42. A flux path thus becomes established, as indicated by the broken line 57, which flux path has a reluctance not greatly differing from that of path 56. In this way thermal expansion effects are compensated for in such a way that operating characteristics remain substantially constant regardless of operating temperatures.

As appears more clearly in Fig. 1, the vertical shaft 51 carries a pinion 58 which is in mesh with idler gear 59. The gear 59 meshes with gear 60, mounted to be connected by dog-clutch 61 with a swing pinion shaft 62. Mounted upon the lower end of the shaft 62 is a swing pinion 63 which meshes with internal ring gear 64, which is securely held upon the crawler base 2. The ring gear 64 is surrounded by a roller track 65 also secured to the crawler base 2 and interposed between the track 65 and the cab 1 is a race of rollers 66. A central guiding gudgeon, concentric with the roller track 5, is employed in conventional manner, but not shown, and in this way the cab 1 is mounted for swinging movement upon the crawler base 2. Swinging movement is brought about by driving the pinion 63, which is accomplished when desired by engaging the dog-clutch 61 and by energizing the windings of drive members 16 or 52.

Figure 5:
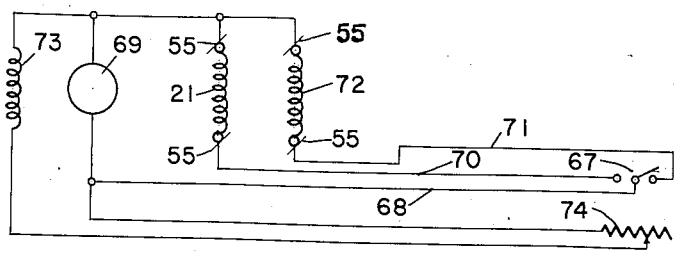
Fig. 5 is a wiring diagram of the electrical circuit employed in the apparatus of this invention.

In order to place the control of the swinging functions of the apparatus within reach of the operator, a switch 67 of the single pole, double throw type is located at the operator's station. The center tap of switch 67 is connected as shown in Fig. 5 by lead 68 with one terminal of generator 69. One of the selectable taps 67 is connected by lead 70 with one of the slip-rings which is in connection with winding 21. The other selectable tap of the switch 67 is connected by the lead 71 with a slip-ring which is in connection with a winding 72 contained within the driving member 52 but shown diagrammatically only in Fig. 5. The other terminal of the generator 69 is permanently connected, as shown, with the slip-rings which are in connection with the upper ends of the windings 21 and 72. The operator may thus, by manipulation of the switch 67, energize either of the magnetic coupling means 14 or 15 at will to produce either right-hand or left-hand swinging of the cab 1.

The generator 69 is preferably of the type having a shunt field winding 73 having in series therewith a variable resistance 74 positioned at the operator's location so that it may be regulated at will.

A generator of this type has, as a typical characteristic, high open circuit voltage and a tendency for its voltage to drop as load is applied. A generator of this type is preferably availed of in the apparatus of this invention for the reason that the windings 21 and 72 are of high impedance and if normal operating voltage is applied thereto a considerable time elapses before full operating current becomes established. By use of the shunt type generator such as generator 69, however, application of high initial voltage of the generator to the windings 21 and 72 causes a rapid building up of current and a very prompt response on the part of the magnetic coupling means 14 and 15. By the time operating current is built up to normal operating levels the output voltage of generator 69 has fallen to normal operating levels and thus there is no condition under which excessive current is able to flow in any part of the circuit.

Figure 2:
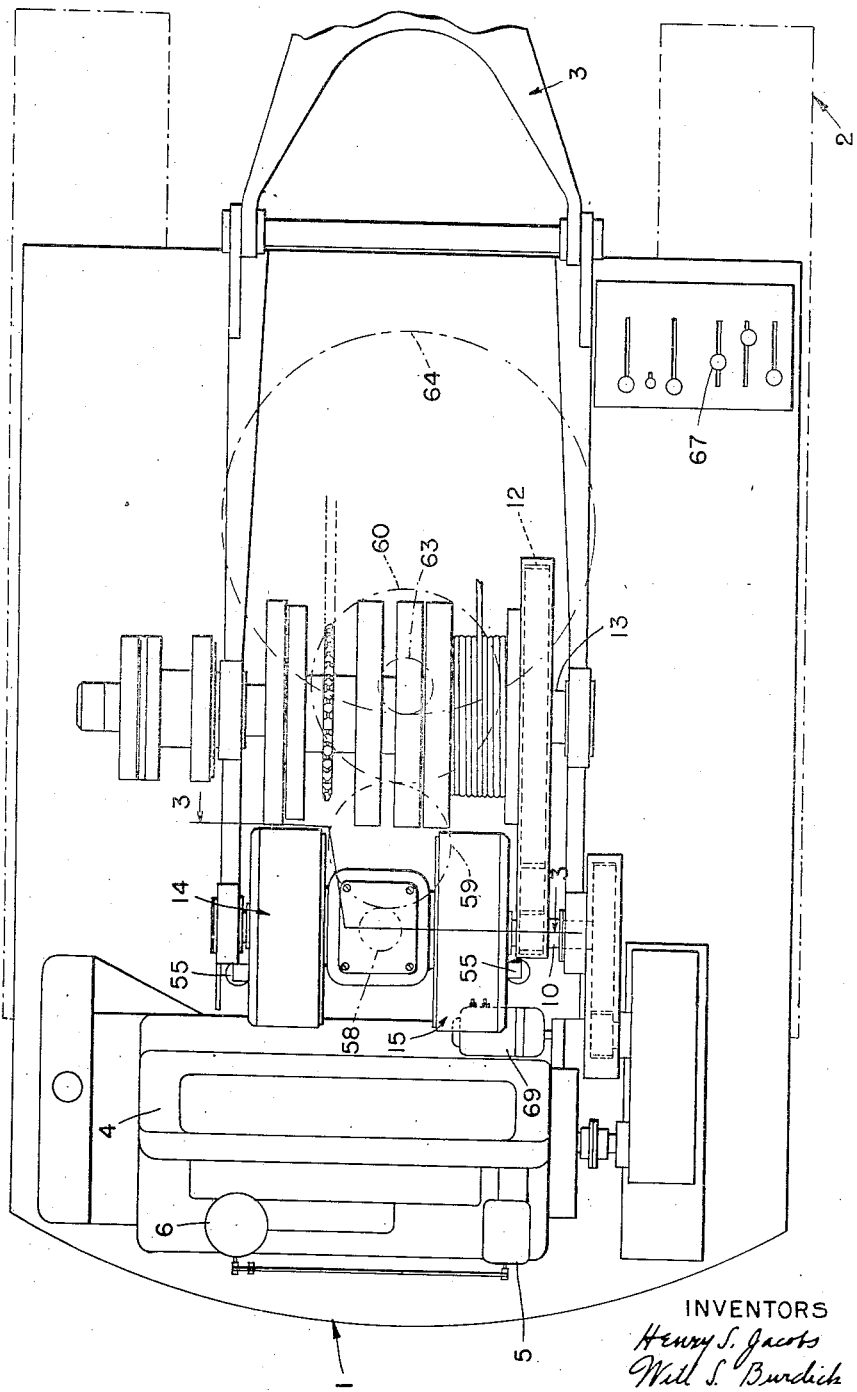
Fig. 2 is a plan view of the apparatus shown in Fig. 1.

In order that the generator 69 exhibit the characteristics desired, it is necessary that it be driven at a fairly constant rate and for this reason it is preferred that generator 69 be mounted as shown in Fig. 2 and directly driven by the prime mover 4.

Because of the large moment of inertia of the cab 1 and associated parts, including the boom 3, the swinging function is one accomplished largely under conditions of slip between the prime mover and the swinging cab. During substantially entire swinging movement acceleration or deceleration is taking place. Therefore, in a machine in which a continuously running prime mover is employed, means which admit of slip must be employed. The magnetic coupling means of this invention admit of this slip without producing frictional wear and at the same time such slip is available for transmission of the torque required. The latter factor is of primary importance, since the torque transmittable by electromagnetic coupling means is greatest when the slip is greatest and falls off accordingly as slip is reduced. The electromagnetic coupling means of this invention are therefore capable of transmitting maximum torque at such times when maximum torque is desired, that is, when acceleration at the outset of the swing is required and when deceleration and reversal of direction of swing are required.

The peak torque demand which the apparatus of this invention places upon the prime mover may be adjusted and fixed at any quantity desired by adjustment of the rheostat 74, or by initial selection of appropriate circuit constants. It is thus beyond the power of the operator, once the system is adjusted, to impose upon the prime mover more than a predetermined peak torque demand. This predetermined peak torque demand may be easily adjusted to a maximum at which the prime mover will continue to run at a reasonably constant rate of speed within the capacity of the governor to maintain satisfactory control. In this way the full power output of the engine is not impaired and the apparatus as a whole is protected against disastrous acceleration, such as might cause crumpling of the boom. While initial high acceleration is thus precluded, sustained accelerations are nevertheless procured to an extent heretofore unattainable in drive systems employing friction clutches. Furthermore, arrangement of the generator which furnishes exciter current to be driven by, or in proportion to, the speed of the prime mover, causes a load-governing action to take place. The output voltage of the generator being thus driven will fall off with any falling off in speed of the engine. Thus, if the operator so operates the machine as to cause the engine to lose speed in spite of the action of the governor, excitation voltage and current will fall off and the load transmittable by the clutches will diminish. This automatic dropping of the load thus safeguards against serious "killing" of the engine, even though the operator has adjusted excitation current to avail of the very limit of the power output of the prime mover. As a result, working cycles may be completed with greater dispatch and full power of the engine is made available for the carrying on of simultaneous functions, such as hoisting during swinging, and the like. The operator is relieved of the mental strain of attempting to avoid injurious and damaging shocks and is encouraged to press his operations toward maximum output. This makes possible a substantial overall increase in the work capacity of the crane so that a substantially smaller crane is capable of performing the work which has heretofore required a crane of substantially greater bulk, weight, and expense.

While this invention has been herein described in connection with a drive system adapted for producing the swinging movement of the crane, the other operating functions of the crane may be similarly driven and controlled, if desired. Because of the high degree of slip normally existing in the swinging driving system, however, electro-magnetic coupling means are of particular value.

While this invention has been herein described by reference to a specific instance of definite application and use, it is intended that the protection of letters patent to be granted hereon be not unnecessarily limited thereby, but that such protection extend to the full limit of the inventive advance disclosed herein as defined by the claims hereto appended.

That which we claim as our invention is:

1. In a power transmission system suitable for transmitting power from a running prime mover to a load to be accelerated and driven, the combination comprising a driving shaft adapted to be driven by said prime mover, a driven shaft adapted to drive said load, electromagnetic eddy current coupling means associated with said driving and driven shafts and adapted to transmit torque therebetween when energized by an electric current, said coupling means including windings, a dynamo electric system of electric current supply having a drooping voltage characteristic mounted to be driven by said prime mover at a rate at all times substantially proportional to the rate of said prime mover, and controllable means for connecting and disconnecting said winding to said dynamo electric system and adapted to apply the high open circuit voltage of said system to said winding when said connection is first made and the lower voltage of said system after a substantial current flow has been established.

2. In a power transmission system suitable for transmitting power from a running prime mover to a load to be accelerated and driven, the combination comprising a governor mounted on said prime mover for regulating the speed of the same, a driving shaft adapted to be driven by said prime mover, a driven shaft adapted to drive said load, electromagnetic eddy current coupling means associated with said driving and driven shafts and adapted to transmit torque therebetween when energized by an electric current, windings in said coupling means, a dynamo electric system of electric current supply having a drooping voltage characteristic mounted to be driven by said prime mover at a rate at all times substantially proportional to the rate of said prime mover, and controllable means for connecting and disconnecting said winding to said dynamo electric system and adapted to apply the high open circuit voltage of said system to said windings when said connection is first made and the lower voltage of said system after a substantial current flow has been established.

3. In an eddy current torque transmitter, the combination comprising a driving member, a driven member, means for establishing a magnetic field mutual to said members and extending from one into the other through zones of localized high flux intensity, a primary air-gap between said driving and driven members subject to being increased by thermal expansion of one of said members, the flux path therethrough being impairable upon said increase, and a supplementary air-gap between said members adapted to be diminished upon said thermal expansion and being positioned to provide a supplementary flux path, the reluctance of which becomes diminished when said primary air-gap is increased by said expansion.

4. In an eddy current torque transmitter, the combination comprising a pole piece member, an eddy current member, said pole piece member being provided with a peripheral groove, windings positioned in said peripheral groove, a plurality of pole pieces ranged along the sides of said peripheral groove and spaced from one another, the ends of said pole pieces being positioned to lie within a surface of revolution coaxial with the axis of said pole piece member, said eddy current member being positioned in close proximity to the path swept by the ends of said pole pieces and being composed of electrically conductive magnetic material, and supplementary pole fingers having faces positioned to lie in a surface of revolution normal to the surface swept by the ends of said pole pieces, said supplementary fingers being secured to said pole piece member in close proximity to said eddy current member.

5. In an eddy current torque transmitter, the combination comprising an internal pole piece member, an external cylindrical sleevelike eddy current member coaxial therewith, said pole piece member being provided with a peripheral groove, a winding positioned in said peripheral groove, a plurality of pole pieces ranged along the sides of said peripheral groove and spaced from one another, the ends of said pole pieces being positioned to lie within a cylindrical surface of revolution coaxial with the axis of said pole piece member, said eddy current member being positioned to surround said pole piece member in close proximity to the path swept by the ends of said pole pieces and being composed of electrically conductive magnetic material, and supplementary pole fingers having faces positioned to lie in a surface of revolution normal to the axis of said pole piece member, said supplementary fingers being secured to said pole piece member in close proximity to the end face of said eddy current member.

HENRY S. JACOBS.
WILL S. BURDICK.